United States Patent
Cha et al.

(10) Patent No.: US 6,764,600 B2
(45) Date of Patent: Jul. 20, 2004

(54) LAGOON FOR HOG WASTE AND THE METHOD OF TREATMENT THEREOF

(75) Inventors: Myung Chul Cha, Seoul (KR); Jihyun Choi, Taejon (KR)

(73) Assignee: Environmental Vision 21, Ltd., Seoul (KR)

(*) Notice: Subject to any disclaimer, the term of this patent is extended or adjusted under 35 U.S.C. 154(b) by 0 days.

(21) Appl. No.: 10/198,254

(22) Filed: Jul. 18, 2002

(65) Prior Publication Data

US 2004/0011734 A1 Jan. 22, 2004

(51) Int. Cl.$^7$ ............... C02F 3/30; C02F 3/06
(52) U.S. Cl. ............ 210/604; 210/605; 210/615; 210/260; 210/916; 435/262.5
(58) Field of Search .............. 210/603, 605, 210/609, 615, 620, 252, 258, 259, 260, 916, 604; 435/262, 262.5; 71/15, 21

(56) References Cited

U.S. PATENT DOCUMENTS

| | | | | |
|---|---|---|---|---|
| 4,122,013 A | | 10/1978 | Greenleaf, Jr. et al. | 210/195 |
| 4,201,663 A | * | 5/1980 | Rollag et al. | 422/4 |
| 4,429,043 A | * | 1/1984 | Paton | 435/167 |
| 4,503,154 A | * | 3/1985 | Paton | 435/167 |
| 4,632,758 A | | 12/1986 | Whittle | 210/603 |
| 4,780,415 A | * | 10/1988 | Ducellier et al. | 435/166 |
| 4,824,563 A | * | 4/1989 | Iwahori et al. | 210/195.1 |
| 5,076,929 A | | 12/1991 | Fuchs et al. | 210/615 |
| 5,078,882 A | | 1/1992 | Northrop | 210/602 |
| 5,182,021 A | * | 1/1993 | Spector | 210/605 |
| 5,338,452 A | * | 8/1994 | Pidaparti | 210/603 |
| 5,736,049 A | | 4/1998 | Bundy et al. | 210/620 |
| 5,755,852 A | * | 5/1998 | Northrop | 71/9 |
| 5,772,887 A | * | 6/1998 | Noah et al. | 210/617 |
| 5,795,480 A | * | 8/1998 | Keun et al. | 210/611 |
| 5,863,434 A | | 1/1999 | Masseet | 210/603 |
| 5,902,484 A | * | 5/1999 | Timpany | 210/621 |
| 6,054,044 A | * | 4/2000 | Hoffland et al. | 210/96.1 |
| 6,071,418 A | | 6/2000 | Tai | 210/760 |
| 6,083,386 A | | 7/2000 | Lloyd | 210/195.1 |
| 6,089,789 A | | 7/2000 | Santamaria | 405/63 |
| 6,103,123 A | | 8/2000 | Gantzer | 210/605 |
| 6,190,566 B1 | | 2/2001 | Kolber | 210/744 |
| 6,207,057 B1 | * | 3/2001 | White | 210/609 |
| 6,224,646 B1 | * | 5/2001 | Arato et al. | 71/9 |
| 6,361,698 B1 | | 3/2002 | Tai | 210/760 |
| 6,375,844 B1 | | 4/2002 | Ehrlich | 210/605 |
| 2001/0013497 A1 | | 8/2001 | Kolber | 210/747 |
| 2001/0025820 A1 | | 10/2001 | Morse et al. | 210/724 |
| 2002/0030012 A1 | | 3/2002 | Sullivan et al. | 210/631 |
| 2002/0074287 A1 | * | 6/2002 | Park et al. | 210/605 |

FOREIGN PATENT DOCUMENTS

| | | |
|---|---|---|
| DE | 19930930 C2 | 3/2002 |
| JP | 61-133200 | 6/1986 |
| JP | 10-286583 | * 10/1998 |

* cited by examiner

Primary Examiner—Fred G. Prince
(74) Attorney, Agent, or Firm—Cheryl H. Agris

(57) ABSTRACT

The present invention relates to a lagoon partitioned for hog waste treatment, and the method of waste treatment in said lagoon. More particularly, the present invention relates to a lagoon for hog waste, which is partitioned into zones separated by walls, comprising a first zone for storing and settling hog waste, a second zone for carrying out sequence batch reaction onto the supernatant from the first zone, a third zone for storing processed liquid materials from the second zone, and a fourth zone for fermenting the solid materials from the first and second zones, wherein a passageway with a pump is installed between the respective two zones for transference of solid and liquid waste materials.

14 Claims, 4 Drawing Sheets

LAGOON FOR HOG WASTE AND THE METHOD OF TREATMENT THEREOF

FIELD OF THE INVENTION

The present invention relates to a lagoon partitioned for hog waste treatment, and the method of waste treatment in said lagoon.

BACKGROUND OF THE INVENTION

Hog waste has been processed by a lagoon method in the US and in some European countries. According to a recent report, there are about 4,500 active hog waste lagoons and 1,700 inactive lagoons just in the state of North Carolina alone.

A lagoon is a simple basin structure, either naturally formed, or artificially built with outer perimeter walls. It is designed to hold animal waste from livestock operations. The lagoon method basically involves dumping of waste such as manure and urine from livestock operations, and waiting for its natural stabilization. After simple retention, the supernatant of the aged waste is reused as pen washing water or sprayed onto the fields. Currently, in many cases, lagoons are rapidly becoming over-capacity, and the only way to relieve them seems to involve applying the wastewater therefrom to the adjacent fields. However, this method poses environmental and public health problems, including extremely unbearable odor, contamination of land by highly concentrated nutrients, and diseases caused by various pathogens.

There have been many efforts to reduce the environmental side-effects associated with the animal waste lagoons. U.S. Pat. No. 5,736,049 focuses on odor control by using aeration devices on top of a lagoon but does not provide further information on other environmental and health problems.

U.S. Pat. No. 6,190,566 discloses a method of replacing an existing lagoon with a wastewater treatment plant for odor control and reduction of waste volume by burning solid waste and sludge in conjunction with biological treatment of wastewater. The method seems to provide an alternative in reducing environmental side-effects caused by animal wastewater. However, the method does not seem to be an economically viable option from the perspective of livestock operators since it involves constructing a separate wastewater treatment plant requiring a substantial engineering work with high operational costs.

Another possible approach to solve these problems of existing lagoons is disclosed in U.S. Pat. No. 5,863,434, which describes an application of a sequencing batch reactor (SBR) as an alternative wastewater treatment method. However, this approach lacks cost-effectiveness from the perspective of livestock operators and is questionable as to how it can be applied to a full-scale lagoon.

The solutions thus supplied so far involve stopgap measures, focusing only on one particular set of problems, such as foul odor of lagoons, or a wholesale application of the conventional technology of wastewater treatment facilities to the livestock operations without consideration for cost effectiveness. Indeed, the removal of odor and nutrients from the existing lagoons can be achieved by such installation of complicated treatment facilities, but this would require a tremendous amount of investment, which in turn would hurt the bottom-line competitiveness of livestock operators.

Therefore, for environmentally sustainable livestock operations, an introduction of a new treatment system seems to be inevitable. Nevertheless, such a system should be economically viable since among other reasons a livestock operation is a highly competitive business. Against this background, the present invention provides a method of retrofitting of an existing lagoon in light of a new treatment system of a partitioned lagoon at a minimum cost, and the method of treating hog waste with removal of excess nutrients and odor.

SUMMARY OF THE INVENTION

The objective of the present invention lies in providing an environmentally sustainable partitioned lagoon, and the method of treating hog waste at a minimum cost. The present invention can be applied to newly built lagoons, or to currently existing lagoons with minimum construction work.

More particularly, the present invention relates to a lagoon for hog waste, which is partitioned into zones separated by walls, comprising a first zone for storing and settling hog waste, a second zone for carrying out sequence batch reaction onto the supernatant from the first zone, a third zone for storing the processed liquid materials from the second zone, and a fourth zone for fermenting the solid materials from the first and second zones, wherein a passageway with a pump is installed between the respective two zones for transference of solid and liquid waste materials.

In order to achieve said objectives, the lagoon for hog waste according to the present invention further comprises a blower to feed air into said second zone for aeration, in which the air is collected from the odorous zones such as said first and fourth zones. Odor causing matters are removed by biological degradation and adsorption in said second zone. The present invention further comprises covers installed over said first and fourth zone for odor control.

Another objective of the present invention is to provide a lagoon for hog waste, which is partitioned into zones separated by walls, comprising a first zone for storing hog waste, a second zone for storing the same after passing through a solid and liquid separator installed there between, a third zone for carrying out sequence batch reaction onto the supernatant from the first zone, a fourth zone for storing the processed liquid materials from the third zone, and a fifth zone for composting the solid materials from said solid and liquid separator and from the third zone, wherein a passageway with a pump is installed between the respective two zones for transference of solid and liquid waste materials.

The lagoon for hog waste according to the present invention further comprises a blower installed between said second and third zones for blowing gas from the second zone to the third zone. The present invention further comprises covers installed over the first and second zones, and over the fifth zone for odor control.

Another objective of the present invention is to provide a method of treating hog waste in a lagoon, which is partitioned into zones separated by walls, comprising transferring hog waste to a first zone for storing and settling the same; carrying out sequence batch reaction in a second zone onto the supernatant transferred from the first zone; storing the processed liquid materials therefrom in a third zone; and fermenting in a fourth zone the solid materials from the first and second zones.

To facilitate the treatment process, the method of treating hog waste in a lagoon according to the present invention entails placing packs of zeolite ceramic balls into said second zone for sequence batch reaction. Further, it may also entail installation of a baffle to the first zone. Moreover, during the sequence batch reaction, a carbon source of methanol or glucose may be added to the second zone for the treatment process therein. For odor control, the method involves blowing by a blower the gas collected from the first and fourth zones to the second zone for sequence batch reaction, and installing covers over said first, and fourth zones.

Another objective of the present invention is to provide a method of treating hog waste in a lagoon, which is partitioned into zones separated by walls, comprising transferring hog waste to a first zone for storing said hog waste, a second zone for further storing the same after passing through a solid and liquid separator installed there between, carrying out sequence batch reaction in a third zone onto the supernatant from said second zone, storing the processed liquid materials therefrom in a fourth zone, and composting the solid materials from said solid and liquid separator and from said third zone.

Here, as described above, the method may involve placing packs of zeolite ceramic balls into said third zone for sequence batch reaction; installing baffles to the first and second zones; adding a carbon source of methanol or glucose to said third zone for sequence batch reaction; blowing by a blower the gas collected from the first and second zones and the fifth zone to the zone for sequence batch reaction for odor control; and installing covers over said first and second zones, and over said fifth zone for odor control.

Another objective of the present invention is to provide a method of treating hog waste by a lagoon, which is partitioned into zones separated by walls, the end products of which are reusable as odorless solid and liquid fertilizers of high quality at a minimum cost.

Ⓟ depicts the pump.

Figure 2:
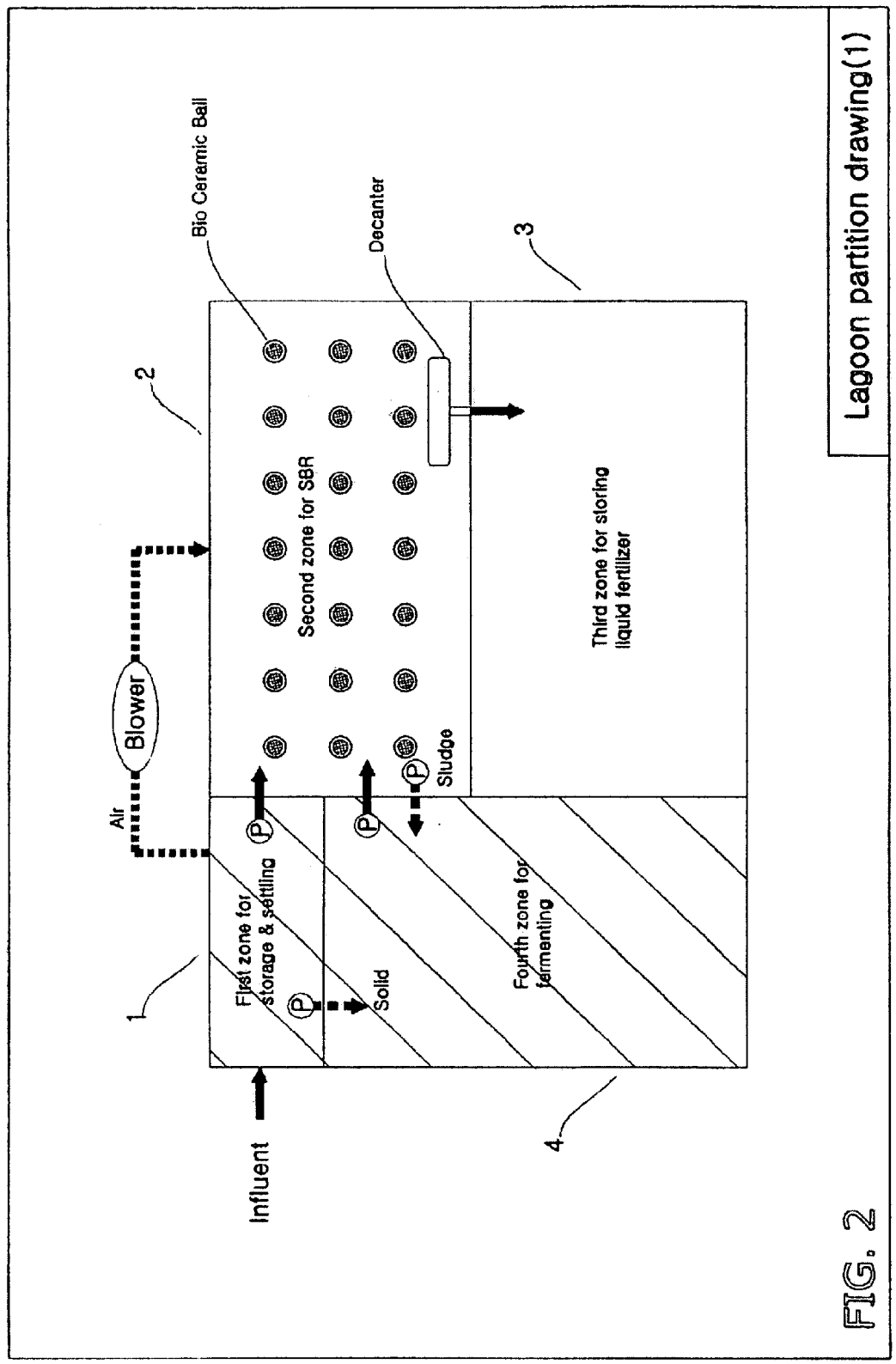

FIG. 2 is a ground plan, which illustrates the zones and the flow of processes of Embodiment 1 of the present invention.

Ⓟ depicts the pump.

Figure 3:
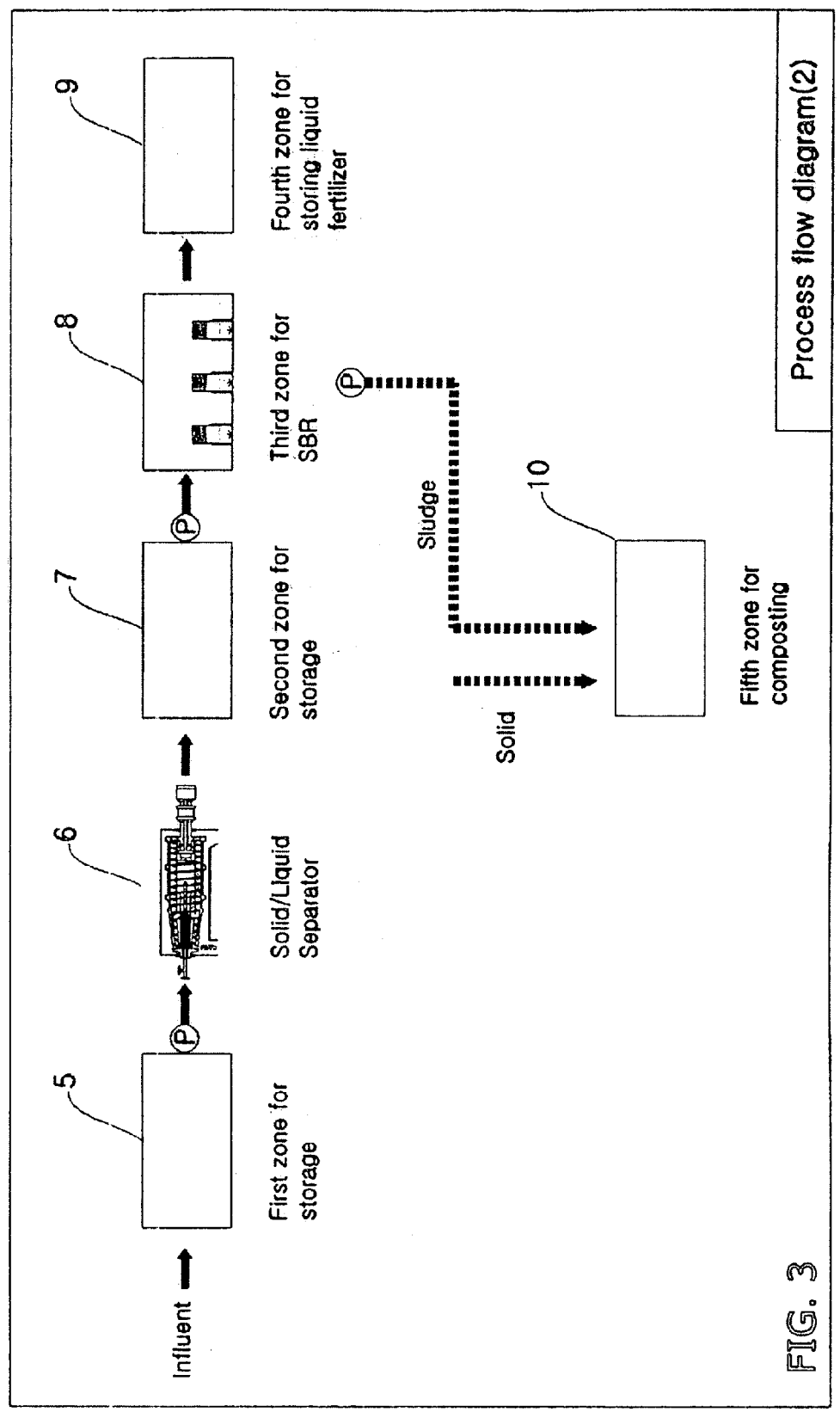

FIG. 3 is a process flowchart, which shows the flow of processes with respect to hog waste in a lagoon according to Embodiment 2 of the present invention.

Ⓟ depicts the pump.

Figure 4:
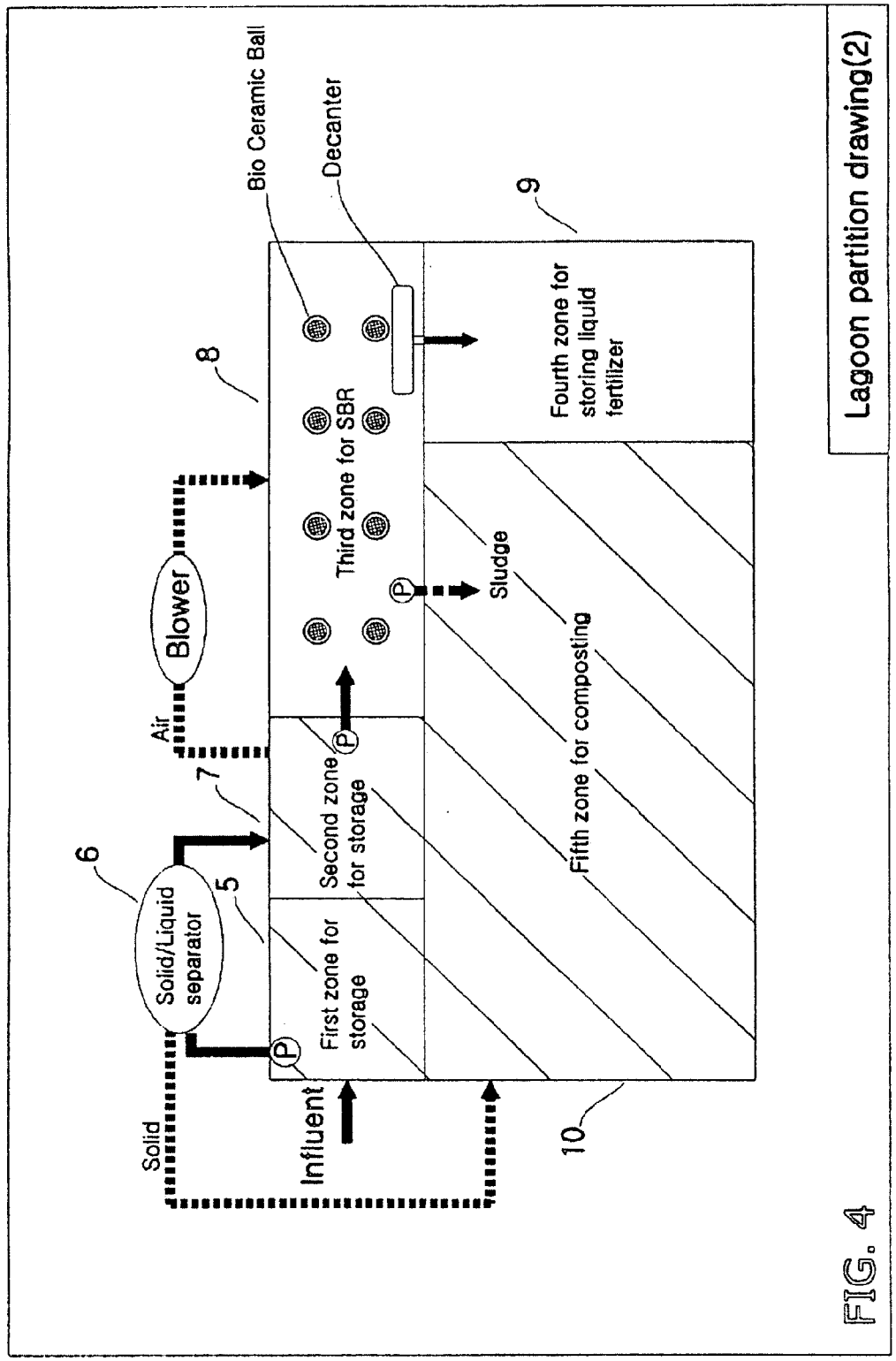

FIG. 4 is a ground plan, which illustrates the zones and the flow of processes of Embodiment 2 of the present invention.

Ⓟ depicts the pump.

DESCRIPTION OF THE PREFERRED EMBODIMENTS

A lagoon partitioned for hog waste treatment, and the method of waste treatment in said lagoon according to the present invention are described in detail as below.

According to the present invention, partitioning of existing lagoons can achieve nutrient removal and odor control. Hog wastewater is separated into liquid and solid materials. Then, the liquid material is treated by a sequence batch reaction (hereinafter SBR) process, and the solid material is treated by a fermentation process or composting process. The hydraulic retention time for each zone so partitioned is determined based on suitable reaction time and the particular circumstances of the site. For example, the hydraulic retention time of a zone for storage should be long enough to hold wastewater for the following SBR process, and that of a zone for SBR should be determined according to the effluent target.

More particularly, to an existing lagoon, the walls are built to set up different compartments or zones (hereinafter zones), each carrying out different functions to process hog waste. The size of each zone is determined by its hydraulic retention time, and the layout of zones is determined by considering effective water and solid flows. Depending on the various factors at the site of an existing lagoon, sheet piles could be constructed as walls for partitioning. For example, steel sheet piles are the most common and are usually installed therein by means of driving.

The zones should be set up in such a way to make the content within one zone impermeable to the adjacent zone. There are no gravitational passageways for water flow because the hydraulic profile and the surface water level of respective zones are equal. Therefore, the water and solid are transferred by means of submersible-type pumps except for the treated water of the SBR process, which is transferred by means of a decanter connected with a pump.

Between the two zones, a passageway is formed for transferring liquid or solid waste materials from one another according to the process flow of the present invention. The passageway comprises a connection of pipes with a pump. For transferring liquid waste materials, a passageway is formed in such a way that the outlet of a zone is positioned at the upper portion of the wall of the zone, and the inlet of a zone is positioned at the lower portion of the wall. For transferring solid waste materials, a passageway is formed in such a way that the outlet of a zone is positioned at the lower portion of the wall of the zone, near to the bottom of the lagoon, where the solid waste materials generally settle, and the inlet of a zone is positioned at the upper portion of the wall.

Embodiment 1

Figure 1:
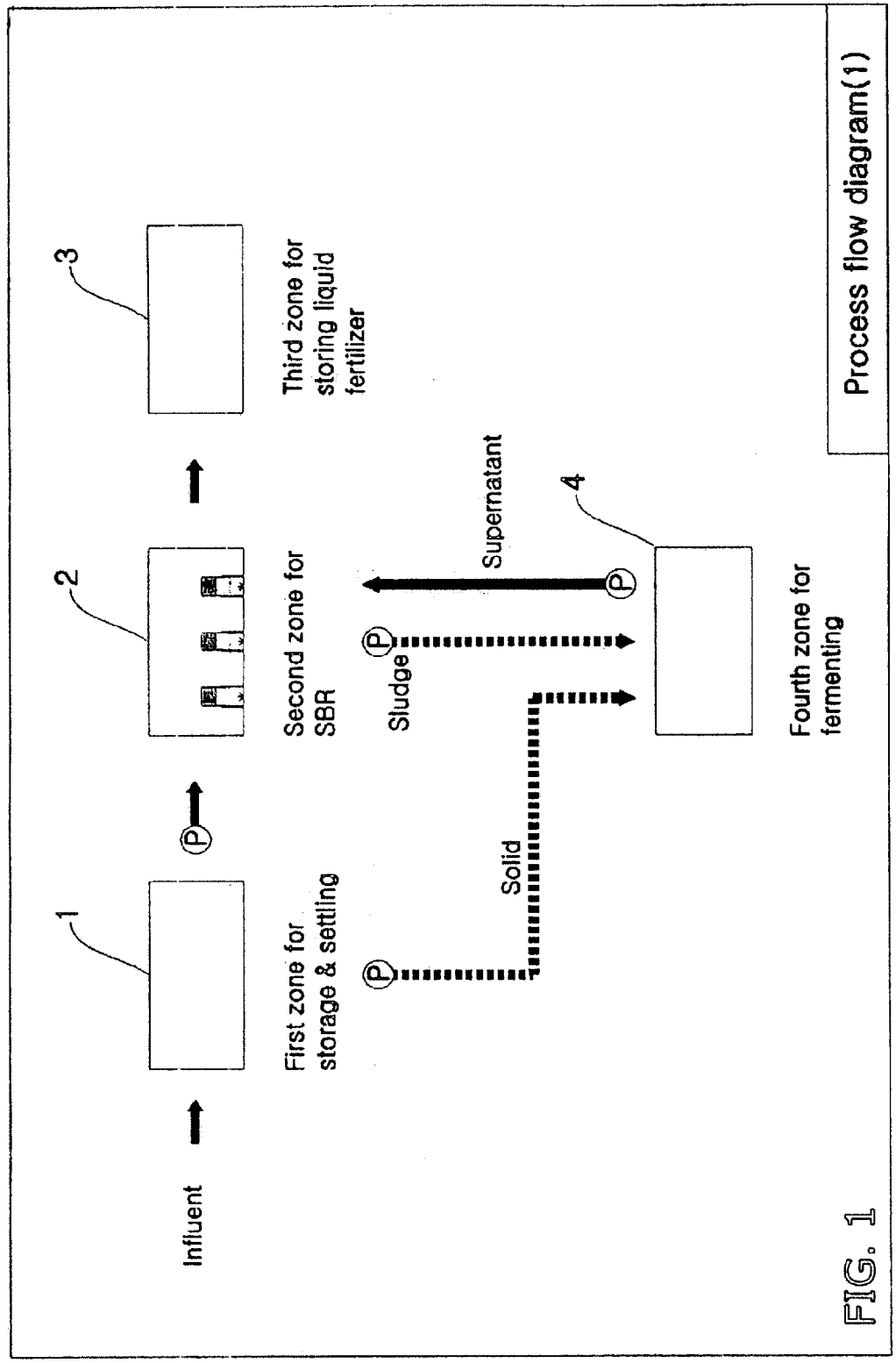
FIG. 1 is a process flowchart, which shows the flow of processes with respect to hog waste in a lagoon according to Embodiment 1 of the present invention.

The flow of processes of Embodiment 1 is shown in FIG. 1. The movements of solid materials are shown in dotted lines, and those of the liquid materials are shown in solid lines. The ground plan according to Embodiment 1 of the present invention is shown in FIG. 2. In addition to the lines as used in FIG. 1, a long-and-short dotted line represents a movement of gas. The shaded areas represent zones requiring odor control. The numeral references therein represent zones, each separated by walls. The outer walls represent the outer perimeters of an actual lagoon.

First, the hog waste is transferred to the first zone 1 for storage and settling, and stays there for about four days in order to provide input equalization and the constant feeding rate for the second zone 2 for SBR. The hog waste contains a very high level of contaminants, about 30,000 mg/l of chemical oxygen demand (hereinafter COD), about 25,000 mg/l of suspended solid (hereinafter SS), about 4,000 mg/l of total nitrogen (hereinafter TN) and about 600 mg/l of total phosphate (hereinafter TP). In the first zone 1 for storage and settling, more than 50% of suspended solid is removed. The first zone 1 for storage and settling basically has two functions of holding influent and settling solid materials, which are essential for the proper operation of SBR. Influent retention needed for intermittent feeding of wastewater to the second zone 2 for SBR, and settling of solid materials is needed for increasing the microorganism population within the mixed liquor suspended solids (MLSS) in the second zone 2 for SBR. The concentration of suspended solid in wastewater should be relatively constant up to 20,000 mg/l.

The minimum hydraulic retention time (HRT) in the first zone 1 for storage and settling is one day, but a HRT of four days is recommended for allowing sufficient time for holding the input in case of abnormal operation of SBR. A baffle can be installed in the first zone 1 for storage and settling to improve its settling efficiency. A baffle divides the zone into an inlet part and a settling part to keep tranquil condition for effective settling.

The solid material at the bottom is then pumped to the fourth zone 4 for fermenting via a submersible pump. At this zone, solids are gravitationally settled within three hours. After the settlement, the supernatant in the first zone 1 is intermittently pumped to the second zone 2 for SBR for organic and nutrient removal.

The second zone 2 for SBR is operated at anoxic and aerobic conditions by turns by maintaining proper nitrification and denitrification mechanisms. The hydraulic retention time (HRT) for the second zone 2 for SBR is about ten days. However, the time can be flexible depending on the target effluent concentration or the size of an existing lagoon. Usually a high ammonium concentration of more than 3,000 mg/l in wastewater decreases the activity of microorganisms. In such situation, ceramic balls, each made of zeolite and clay, can be packed partially in the second zone 2 for SBR to allow adsorption of ammonium ions by way of ion-exchange capacity of zeolite. The effluent of the second zone 2 for SBR can be used as liquid fertilizer, which is sanitarily safe without any odor, or *E. coli* and coliform. Indeed, in the field test, the hog wastewater treated by SBR with zeolite ceramic balls was shown to not contain *E. coli* and fecal coliforms, without any odor.

Table 1 shows the operation mode of SBR, which is a modification of the conventional SBR process for suitable incorporation into the present invention. Basically, the SBR process of Table 1 is a 24-hour cycle system, which involves a repetition of anoxic and aerobic conditions. At an aerobic state when air is blown therein, organic materials are removed therefrom and ammonium nitrogen is transformed into nitrite nitrogen and nitrate nitrogen (nitrification). At an anoxic state when air-blowing stops, nitrite nitrogen and nitrate nitrogen are transformed back to nitrogen gas (denitrification). Hog wastewater is fed therein during the anoxic condition because the organic materials as input are consumed as an energy source for denitrification. After a repetition of anoxic and aerobic conditions, the sludge settles after about one hour, which is then followed by decanting of the supernatant.

TABLE 1

| Time (hr) | Mode | Influent |
|---|---|---|
| 1 | Anoxic | ←Fill |
| 2 | | |
| 3 | Aerobic | |
| 4 | | |
| 5 | Anoxic | ←Fill |
| 6 | | |
| 7 | Aerobic | |
| 8 | | |
| 9 | Anoxic | ←Fill |
| 10 | | |
| 11 | Aerobic | |
| 12 | | |
| 13 | Anoxic | ←Fill |
| 14 | | |
| 15 | Aerobic | |
| 16 | | |
| 17 | Anoxic | ←Fill |
| 18 | | |
| 19 | Aerobic | |
| 20 | | |

TABLE 1-continued

| Time (hr) | Mode | Influent |
|---|---|---|
| 21 | Settling/Draw/Idle | |
| 22 | | |
| 23 | | |
| 24 | | |

The HRT for the second zone 2 for SBR should be relatively long, i.e., more than ten days, due to its high organic and nitrogen loads in hog wastewater. The determination of HRT depends on the target effluent quality. In the field experiment, the COD and TN removal efficiencies reached up to 85% and 80%, respectively, using the proposed SBR with the HRT of ten days.

Moreover, packaged zeolite ceramic balls can be put into the second zone 2 for SBR. With respect to nitrifying microorganisms such as Nitrosomonas and Nitrobacter, the nitrification of hog wastewater is inhibited by toxic effect, caused from its high ammonium ion concentration of more than 3,000 mg/l. However, many studies have shown that aluminosilicate-based zeolite ceramic within the reactor decreases this type of toxic levels and increases the treatment efficiency by adsorption of ammonium ions and by slowly releasing them through bio-regeneration processes. In the current application, 5 kg of ceramic was used to treat 1 kg of nitrogen load for the SBR system.

The supernatant of the first zone 1 for storage and settling is fed to the bottom portion of the second zone 2 for SBR to enhance the mixing effect of influent organic materials and to facilitate settling of sludge during its anoxic stage.

After the SBR process in the second zone 2 for SBR, the supernatant is decanted to the third zone 3 for storage of liquid fertilizer. By way of using as a submersible type pump, the sludge produced in the second zone 2 for SBR after completion of SBR is pumped to the fourth zone 4 for fermenting, which stays there for about ten days.

As described above, with the sludge from the zone 2 for SBR, the solid materials from the first zone 1 for storage and settling stay in the fourth zone 4 for fermenting with a minimum HRT of about ten days. In the fourth zone 4 for fermenting, the solid waste of organic materials is converted to easily biodegradable organic acids under anaerobic condition. There, the refractory matters are converted into biodegradable materials through fermentation processes, and the COD is reduced by 20~30%. Then, the supernatant therein is directed back to the second zone 2 for SBR for further treatment, and the solid materials, which have settled therein, can be used as fertilizer of high quality, or could be resold as value-added products after addition of a few additives and ingredients.

Hog waste is an extremely odorous substance because it contains ammonia gas, hydrosulfide and methyl mercaptan, etc. However, during and after the aerobic treatment process, the hog waste is changed into one that is odorless. Therefore, the odor producing zones such as the first zone 1 for storage and settling, and the fourth zone 4 for fermenting should be controlled as follows: Usually, the air needed for the SBR operation is fed from the outside. However, when the air needed for the second zone 2 for SBR is collected from said odor-producing zones and blown thereto, the odor causing matters contained in the air are removed by biological degradation and adsorption during the SBR operation. For the collection of odorous air, the first zone 1 for storage and settling, and the fourth zone 4 for fermenting should be covered with a cover, preferably of plastic.

Embodiment 2

The flow of process of Embodiment 2 is shown in FIG. 3. The ground plan according to Embodiment 2 of the present invention is shown in FIG. 4. The conventions used in FIGS. 1 and 2 are also applicable to FIGS. 3 and 4.

While utilizing the basic principle processes of the present invention, Embodiment 2 encompasses a different zone layout from that of Embodiment 1. In addition to those zones in Embodiment 1, Embodiment 2 includes a mechanical solid/liquid separation, and composting processes. Embodiment 2 can be realized for example by a lagoon with zones, as shown FIG. 4.

The hog waste comes into the first zone 5 for storage in FIG. 4 and is pumped to the solid/liquid separator 6. The waste stays in the first zone 5 for storage for one to two days to equalize input and to provide the constant feeding rate for the solid/liquid separator 6, which is operated mechanically. A mechanical solid/liquid separator is used to separate the solid materials with low water content, suitable for composting, from the rest of the liquid matters. Generally, a screw decanter type separator is used for solid/liquid separation.

Then, the solid materials from the separator 6 go into the fifth zone 10 for composting, and the liquid therefrom flows to the second zone 7 for storage. The hydraulic retention time (HRT) in the second zone 7 for storage is about two days, and the liquid in the second zone 7 for storage is intermittently pumped to the third zone 8 for SBR in the same way as in Embodiment 1.

The wastewater in the second zone 7 for storage is pumped to the third zone 8 for SBR for organic and nutrient removal, and the treated water therein is decanted to the fourth zone 9 for storage of liquid fertilizer, which can be used in future farming operations. The sludge produced in the third zone 8 for SBR is pumped to the fifth zone 10 for composting. In addition to the solid materials from the solid/liquid separator 6, the sludge from the third zone 8 for SBR flows to the zone 10 for composting with a minimum retention time of two months. Moreover, the composting process is enhanced by water content control by adding sawdust, chaff and hay as a bulking agent and by occasionally turning over the composting bed. The compost can be used as fertilizer or resold as value-added products after addition of a few additives and ingredients.

Hog waste is an extremely odorous substance because it contains ammonia gas, hydrosulfide, methyl mercaptan, etc. However, during and after the aerobic treatment process, the hog waste is changed into one that is odorless. Therefore, the odor-producing zones such as the first and second zones (5, 7) for storage, and the fifth zone 10 for composting should be controlled as follows: Usually, the air needed for the SBR operation is fed from the outside. However, when the air needed for the third zone 8 for SBR is collected from the odor-producing zones and blown thereto, the odor causing matters contained in the air are removed by biological degradation and adsorption during the SBR operation. For the collection of odorous air, the first and second zones (5, 7) for storage, and the fifth zone 10 for composting should be covered with a cover, preferably of plastic.

The present invention may be embodied in other specific forms, including variations in number of zones, without departing from the spirit or essential characteristics thereof. The embodiments disclosed in this application are to be considered in all respects as illustrative and not restrictive, the scope of the present invention being indicated by the appended claims rather than by the foregoing description, all changes that come within the meaning and range of equivalency of the claims are intended to be embraced therein.

Various references are cited herein, the disclosures of which are incorporated by reference in their entireties.

What is claimed is:

1. A lagoon for hog waste, which is partitioned into zones separated by walls, comprising a first zone for storing and settling hog waste, a second zone for carrying out sequence batch reaction onto the supernatant from the first zone, a third zone for storing processed liquid materials from the second zone, and a fourth zone for fermenting the solid materials from the first and second zones, wherein a passageway with a pump is installed between the respective two zones for transference of solid and liquid waste materials.

2. The lagoon for hog waste according to claim 1, which comprises a blower installed between said first zone and said second zone for blowing gas from said first and fourth zones to said second zone for carrying out sequence batch reaction onto the supernatant from the first zone.

3. The lagoon for hog waste according to claim 1, which comprises covers installed over the first zone for storing and settling, and over the fourth zone for fermenting.

4. A lagoon for hog waste, which is partitioned into zones separated by walls, comprising a first zone for storing hog waste, a second zone for storing the same after passing through a solid and liquid separator installed there between, a third zone for carrying out sequence batch reaction onto the supernatant from the second zone, a fourth zone for storing processed liquid materials from the third zone, and a fifth zone for composting the solid materials from said solid and liquid separator and from the third zone, wherein a passageway with a pump is installed between the respective two zones for transference of solid and liquid waste materials.

5. The lagoon for hog waste according to claim 4, which comprises a blower installed between said second zone for storing and said third zone for blowing gas from said first, second and fifth zones to said third zone for carrying out sequence batch reaction onto the supernatant from the second zone.

6. The lagoon for hog waste according to claim 4, which comprises covers installed over the first and second zones for storing, and over the fifth zone for composting.

7. A method of treating hog waste in a lagoon, which is partitioned into zones separated by walls, comprising transferring hog waste to a first zone for storing and settling the same; carrying out sequence batch reaction in a second zone onto the supernatant transferred from the first zone; storing processed liquid materials therefrom in a third zone; and fermenting in a fourth zone the solid materials from the first and second zones.

8. The method of treating hog waste in a lagoon according to claim 7, which comprises installing packs of zeolite ceramic balls into said second zone for carrying out sequence batch reaction.

9. The method of treating hog waste in a lagoon according to claim 7, which comprises blowing by a blower the gas collected from the first zone and the fourth zone to the second zone for carrying out sequence batch reaction.

10. The method of treating hog waste in a lagoon according to claim 7, which comprises installing covers over said first zone, and over said fourth zone.

11. A method of treating hog waste in a lagoon, which is partitioned into zones separated by walls, comprising transferring hog waste to a first zone for storing said hog waste, a second zone for further storing the same after passing through a solid and liquid separator installed there between, carrying out sequence batch reaction in a third zone onto the supernatant from said second zone, storing processed liquid materials therefrom in a fourth zone, and a fifth zone for composting the solid materials from said solid and liquid separator and from said third zone.

12. The method of treating hog waste in a lagoon according to claim 11, which comprises installing packs of zeolite ceramic balls into said third zone for carrying out sequence batch reaction.

13. The method of treating hog waste in a lagoon according to claim 11, which comprises blowing by a blower the gas collected from the first, second and fifth zones to the third zone for carrying out sequence batch reaction.

14. The method of treating hog waste in a lagoon according to claim 11, which comprises installing covers over said first and second zones, and over said fifth zone.

* * * * *